(12) United States Patent
Quintanilla et al.

(10) Patent No.: US 10,642,988 B2
(45) Date of Patent: May 5, 2020

(54) REMOVABLE MEDIA PROTECTED DATA TRANSFER IN A CYBER-PROTECTED SYSTEM

(71) Applicant: HONEYWELL INTERNATIONAL INC., Morris Plains, NJ (US)

(72) Inventors: Brian Quintanilla, Houston, TX (US); Eric T. Boice, Peoria, AZ (US); Eric D. Knapp, Milton, NH (US)

(73) Assignee: Honeywell International Inc., Morris Plains, NJ (US)

(*) Notice: Subject to any disclaimer, the term of this patent is extended or adjusted under 35 U.S.C. 154(b) by 64 days.

(21) Appl. No.: 15/669,417

(22) Filed: Aug. 4, 2017

(65) Prior Publication Data

US 2018/0039780 A1 Feb. 8, 2018

Related U.S. Application Data

(60) Provisional application No. 62/370,993, filed on Aug. 4, 2016.

(51) Int. Cl.
*G06F 21/60* (2013.01)
*H04L 29/06* (2006.01)
(Continued)

(52) U.S. Cl.
CPC ............ *G06F 21/602* (2013.01); *G06F 21/85* (2013.01); *H04L 9/3263* (2013.01);
(Continued)

(58) Field of Classification Search
CPC ............. G06Q 20/367; G06Q 20/3829; G06Q 20/401; G06Q 2220/10
See application file for complete search history.

(56) References Cited

U.S. PATENT DOCUMENTS 6,014,746 A    1/2000  Krehnke et al.
9,027,123 B2*  5/2015  Yanoo .................... G06F 21/55
                                                                714/39
(Continued)

OTHER PUBLICATIONS

Reddy et al., "USB_SEC: A secure application to manage removable media," 2016 10th International Conference on Intelligent Systems and Control (ISCO) Year: 2016 | Conference Paper | Publisher: IEEE.*

(Continued)

*Primary Examiner* — Roderick Tolentino

(57) ABSTRACT

A method of data transfer in a cyber-protected system includes inserting a removable media device into a removable media interface of a Secure Media Exchange (SMX) kiosk running a cyber-checking algorithm. The SMX kiosk includes a user interface, physical controls, input and output ports. An enclosure for physical protection prevents access to the physical controls, input and output ports configured with openings revealing the removable media interface and user interface. The cyber-checking algorithm inspects the removable media device for threats and adds encryption to the removable media device only if passing inspecting. The cyber-protected system includes networked devices coupled to communicate over a communications network including at least one SMX protected machine at a protected system node having a SMX algorithm and an encryption key. The SMX algorithm allows reading information from the removable media device on the SMX protected machine only if the encryption is confirmed.

13 Claims, 7 Drawing Sheets

(51) Int. Cl.
H04L 9/32 (2006.01)
G06F 21/85 (2013.01)
(52) U.S. Cl.
CPC ...... *H04L 63/0209* (2013.01); *H04L 63/0428* (2013.01); *H04L 63/0853* (2013.01); *H04L 63/1441* (2013.01)

(56) References Cited

U.S. PATENT DOCUMENTS

| | | | | |
|---|---|---|---|---|
| 2006/0136748 | A1* | 6/2006 | Bade | G06F 21/33 713/193 |
| 2007/0297149 | A1 | 12/2007 | Richardson et al. | |
| 2008/0288790 | A1* | 11/2008 | Wilson | G06F 21/34 713/194 |
| 2010/0007487 | A1* | 1/2010 | Warner | G08B 25/006 340/539.16 |
| 2010/0008028 | A1 | 1/2010 | Richardson et al. | |
| 2010/0146264 | A1* | 6/2010 | Blume | G06F 21/33 713/156 |
| 2010/0169123 | A1* | 7/2010 | Maus | A61B 5/0002 705/3 |
| 2010/0332728 | A1* | 12/2010 | Liu | G06F 16/1847 711/103 |
| 2012/0266230 | A1 | 10/2012 | Vanderpol et al. | |
| 2013/0054962 | A1* | 2/2013 | Chawla | H04L 9/3263 713/156 |
| 2013/0091575 | A1* | 4/2013 | Duncan | G06F 21/56 726/24 |
| 2016/0050225 | A1 | 2/2016 | Carpenter et al. | |
| 2016/0094578 | A1* | 3/2016 | McQuillan | H04L 63/1433 726/23 |
| 2016/0328579 | A1* | 11/2016 | Jois | G06F 21/56 |
| 2017/0346846 | A1 | 11/2017 | Findlay | |

OTHER PUBLICATIONS

Shue et al., "Embracing the cloud for better cyber security," 2011 IEEE International Conference on Pervasive Computing and Communications Workshops (PERCOM Workshops) Year: 2011 | Conference Paper | Publisher: IEEE.*
PC Enclosures Product Brochure, www.pcenclosures.net/sites/default/files/PDFs/PCEnclosures_Product_Brochure.pdf.
Olea Kiosks, Inc., https://www.olea.com/wp-content/uploads/2015/08/CaliforniaCyberSecurity_Datasheet_082015.pdf, Cyber Security Kiosk Data Sheet, 2015.

* cited by examiner

REMOVABLE MEDIA PROTECTED DATA TRANSFER IN A CYBER-PROTECTED SYSTEM

CROSS-REFERENCE TO COPENDING APPLICATIONS

This application has subject matter related to copending application Ser. No. 15/469,816 entitled "SYSTEM AND METHOD SUPPORTING SECURE DATA TRANSFER INTO AND OUT OF PROTECTED SYSTEMS USING REMOVABLE MEDIA" that was filed on Mar. 27, 2017.

CROSS REFERENCE TO RELATED APPLICATIONS

This application claims the benefit of Provisional Application Ser. No. 62/370,993 entitled "PHYSICALLY PROTECTED DATA TRANSFER BY REMOVABLE MEDIA INTO AND OUT OF A CYBER-PROTECTED SYSTEM", filed on Aug. 4, 2016, which is herein incorporated by reference in its entirety.

FIELD

Disclosed embodiments relate generally to computing and network security. More specifically, disclosed embodiments relate to cyber-security for protecting network systems from threats posed by removable media.

BACKGROUND

A cyber-secure facility such as an industrial control system (ICS) in a manufacturing plant, critical manufacturing facility, health care facilities/hospital, or classified network area that each include a plurality of networked devices all generally require access controls and possibly other cyber-security controls to limit network access. However, when normal network access is highly controlled, the continued need to transfer information into these facilities has led to the increased use of removable media devices (e.g., Universal Serial Bus (USB) flash drives) to bring in necessary information or files (e.g., application patches, diagnostics applications, and/or documentation) in the facility. The result is that this recent dependence upon removable media devices has created a new vector for cyber-attacks into protected network systems.

Some assessments of cyber-security needs and incidents at customer' ICS facilities have shown that USB drives are the primary inbound vector through which viruses and other malware enter these cyber-secure ICS facilities. These cyber-secure ICS facilities rely on physical security to protect the site and systems. Physical security can limit physical access to the facilities with badges only accessible areas, fences, video monitoring, or other physical security measures. Physical security can be just as important at the cyber-protection because in some cases limiting access to a facility to a limited number of users can diminish the chances of a cyber-attack.

SUMMARY

This Summary is provided to present a summary to briefly indicate the nature and substance of this Disclosure. It is submitted with the understanding that it will not be used to interpret or limit the scope or meaning of the claims.

Disclosed embodiments include a method of protected data transfer by removable media into and out of a cyber-protected system (e.g., an ICS or industrial facility), an enabling Secure Media Exchange (SMX) kiosk for running a cyber-checking algorithm, and a system for implementing the protected data transfer method, each controlling how files are moved into and out of the system over removable media devices. As known in the art a 'removable media device' is a data storage device used to transport electronic files from one place to another that can be inserted or removed from a computer system while the system is running. Examples of removable media devices include Compact Discs (CDs), Digital Versatile Discs (DVDs), Blu-Ray disks, diskettes and most commonly Universal Serial Bus (USB) flash drives.

A disclosed SMX kiosk running a disclosed cyber-checking algorithm has code that adds encryption only if the removable media device is determined to be cyber-safe and a SMX algorithm implementing a driver and agent installed at one or more machines at nodes in the communications network of the system are used in conjunction to provide system cyber-protection, such as nodes in an ICS in one example embodiment. The SMX kiosk is setup in a selected location outside the communications network and the SMX algorithm is installed generally on a plurality of machines in the communications network, such as devices or apparatus (e.g., process controllers) having a processor and an associated memory (e.g., a personal computer) that a customer wants to cyber-protect. The SMX kiosk is made safe to potential hacking by providing it within an enclosure that ensures physical protection which prevents access to digital security related features including its physical controls, input ports and output ports to prevent access to the system implementing the method for securing data on the removable media device.

After the SMX algorithm has been installed on a machine to render it a protected machine the only way a removable media device will function to transfer data to that protected machine is if the removable media device has already been successfully "checked-in" by the SMX kiosk that runs the cyber-checking algorithm which adds encryption (e.g., 256-bit encryption) or a related digital certificate to the removable media device. The encryption enables file(s) on the removable media device to be read by protected machine which is provided the 'key' to the encryption. In this "check-in" procedure provided the removable media device passes the cyber-checking algorithm which includes looking for viruses or other file irregularities, the file(s) having the added encryption can only be used on an SMX protected system that has the key to the encryption, and will not work (i.e., be inaccessible to reading) on a non-protected SMX system lacking a disclosed SMX algorithm.

Thus protected machines running a SMX algorithm prevents information being read from the removable media device unless it reads the particular encryption applied by the SMX kiosk. As a result, when file(s) on a removable media device are brought into such a cyber-secure network there is an assurance that the file(s) are 'safe', meaning that they are not infected with a computer virus, and they are authorized files (i.e., that they are files that allowed and intended to be transferred into or out of the secure system). Once the removable media device is finished transferring data to the protected machine it will then be "checked-out" by the SMX algorithm, which removes the encryption to that removable media device so that it will no longer function on a SMX protected machine and will only function on non-protected machines.

DETAILED DESCRIPTION

Figure 1:
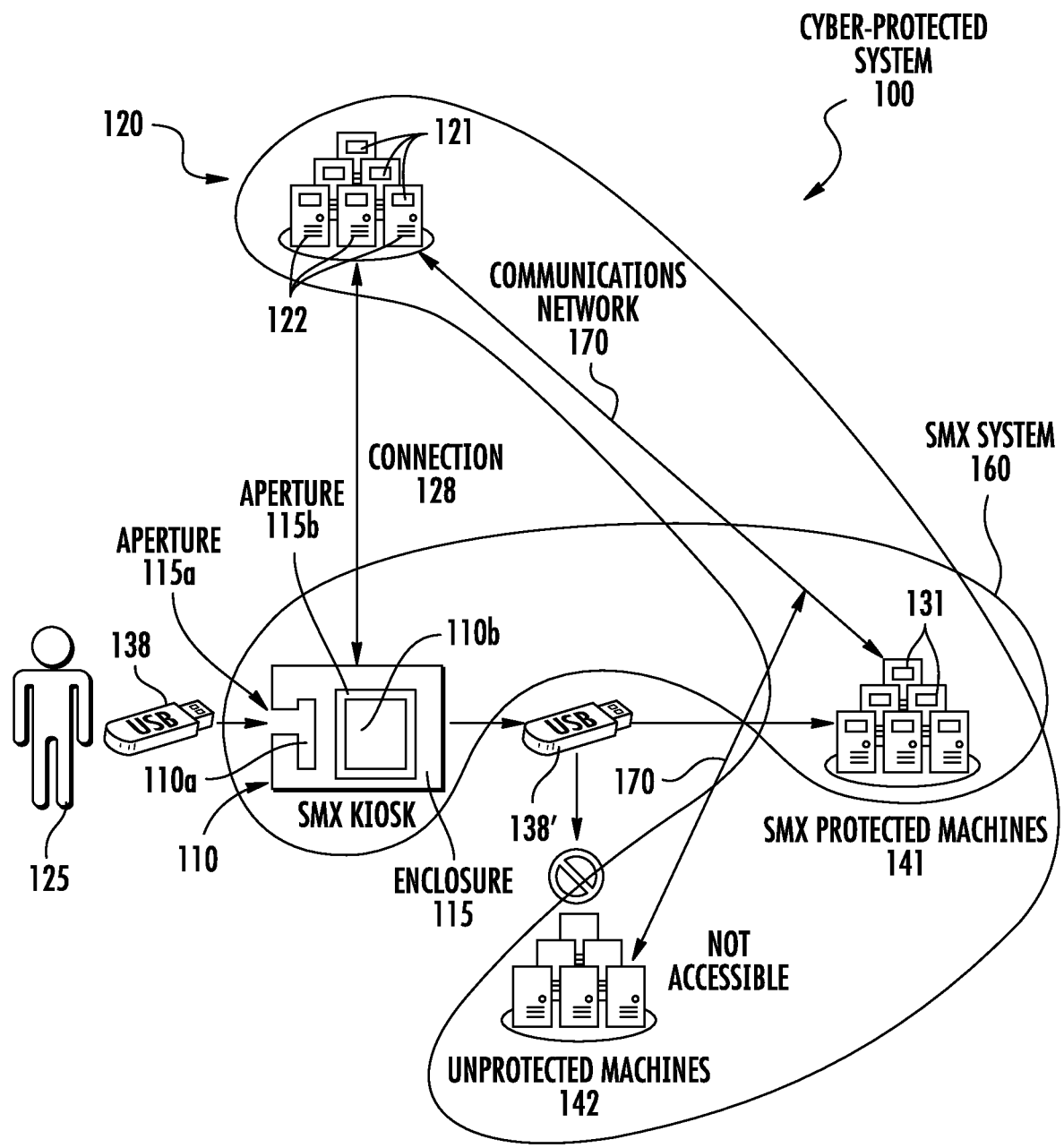
FIG. 1 shows an example system including an example cyber-protected system including a communications network cyber-protected from removable media devices by a SMX kiosk running a cyber-checking algorithm for detecting known threats and adding encryption to the removable media device having an enclosure for physical protection which prevents access located outside of the cyber-protected network, and at least one SMX algorithm installed on a network connected SMX protected machine that has a key to the encryption which allows reading information from the removable media device on the SMX protected machine only if the SMX protected machine confirms a presence of the encryption, according to an example embodiment.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

SMX as used herein is the term used for disclosed SMX systems which implement methods of ensuring that information stored on a removable media device is authorized, safe (e.g., virus-free) and unaltered before being authorized to enter (e.g., to be read at a node in) a cyber-secure (protected) system. The threat checking of the removable media device is provided by a SMX system including (i) a SMX algorithm (providing a driver/agent) that is installed on one or more protected system nodes within the cyber-protected system (e.g., in the case of an ICS, level 3.5 of the Purdue model or a level below) and (ii) a SMX kiosk which is located outside of the cyber-protected system (e.g., in the case of an ICS, the SMX kiosk is located at Level 4 of the Purdue model, outside of the Industrial Control System Demilitarized Zone (DMZ)), where the SMX kiosk runs the cyber-checking algorithm on the removable media device.

The SMX kiosk can comprise a desktop computer, laptop computer, server computer, or tablet computer having at least one interface for coupling to removable media. The SMX kiosk functionality can be implemented in any suitable manner, such as by using one or more executed software or firmware routines. The SMX kiosk is inside a protective enclosure for physical protection which prevents access to digital security related features including to physical controls, input ports and output ports that has an exposed removable media interface for receiving the removable media that enables the checking of the removable media device to ensure it is authorized, safe and unaltered (e.g., lacking viruses), and a user interface input port typically being a display screen.

As known in the art of process control an ICS includes different types of control systems and associated instrumentation used in industrial production technology, including supervisory control and data acquisition (SCADA) systems, DCSs, or other control system configurations such as programmable logic controllers (PLCs). Such ICS are commonly used in industrial systems for electrical, and oil, or gas processing. Based on data received from remote stations over a local area network (LAN) that generally each have a processor with associated memory, automated or operator-driven supervisory commands can be pushed to remote station control devices, referred to as field devices (sensor and actuators). Any of these remote station nodes can pose a cyber-security risk to the LAN.

In the case of an ICS, a disclosed SMX kiosk is physically protected because it is outside of the ICS's DMZ. In computer security, a DMZ (or a perimeter network) according to the US ICS-CERT is a network area (a subnetwork) that is between an internal network (e.g., a local area network (LAN)) and an external network. The function of the DMZ is that connections from the internal network and the external network to the DMZ are permitted, whereas connections from the DMZ are only permitted to the external network, where hosts in the DMZ may not connect to the internal network. This allows the DMZ's hosts to provide services to the external network while protecting the internal network in case intruders compromise a host in the DMZ. For an individual on the external network who wants to illegally connect to the internal network, the DMZ is thus a 'dead end'. The security DMZ is therefore used for providing external controlled access to services used by external personnel to the control system network control system equipment to ensure secure application of system updates and upgrades.

Physically securing the SMX kiosk using an outer enclosure protects its physical controls from access by potential tamperers, such as to its multifunction key, WINDOWS key, power button, brightness and volume control. Also the enclosure protects the input/output ports such as USB, mini display port and the power connector which are also recognized to be important to the digital security used in the SMX kiosk. Most known server enclosures are only for mounting and preventing the physical removal of the system. Disclosed enclosures in contrast provide mounting options, theft prevention and a physical barrier providing tamper prevention of the outside ports/physical ports of the SMX kiosk. By securing the SMX kiosk with a disclosed enclosure that ensures physical protection which prevents access to the SMX kiosk's digital security related features, prevention of data loss is implemented and the customer's site is protected from cyber-attacks repelling attacks directed at the SMX kiosk that would otherwise provide a direct gateway into the network of the customer' site if it was compromised physically by an attacker.

FIG. 1 shows a simplified example cyber-protected system 100 having a cyber-protected communications network 170 comprising a SMX system 160 including at least one SMX kiosk 110 having an enclosure 115 for physical protection which prevents access to digital security related features including to physical controls, input ports and output ports located outside of the cyber-protected communications network 170, and at least one cyber-checking algorithm 121 shown installed on the computing devices 122 of a network connected remote service center (RSC) 120 (e.g., each computing device 122 running a supported version of WINDOWS operating system). The RSC 120 itself and other network nodes require cyber-protection including machines at nodes shown SMX protected machines 141 which are all inside the cyber-protected communications network 170 each protected machine having an installed SMX algorithm 131. The computers of the RSC 120 can also each include the SMX algorithm 131 to be protected machines besides having the cyber-checking algorithm 121 shown in FIG. 1. RSC 120 is shown coupled to the SMX kiosk 110 by a connection 128 that can be a wireless connection or a wired connection (e.g., Ethernet cable), such as secure fourth-generation long term evolution ((LTE) 4G) for a wireless connection or an Ethernet connection for a wired connection depending on the customer's specifications.

FIG. 1 also provides a depiction of steps in an example "check-in" and "check-out" procedure performed by the SMX kiosk 110. FIG. 1 shows optional connections from the SMX kiosk 110 to the RSC 120 and shows the accessibility of a removable media device 138 shown by example as a USB drive that is rendered an altered removable media device 138' by the SMX kiosk 110 (e.g., by adding encryption if determined to be 'safe') to enable access to a protected machine or system (shown as SMX protected machine 141) after the "check in" procedure has happened and is successful. It is an advantage for the cyber-checking algorithm 121 to be at RSC 120 as shown in FIG. 1 because upon an encryption update (e.g., when at least one new virus is identified) provided to the RSC 120 the RSC 120 can then provide new encryption information to the SMX kiosk 110 and a key to this new encryption information to the SMX protected machine 141. However, in another arrangement the cyber-checking algorithm 121 is installed directly on the SMX kiosk 110.

As described above the SMX algorithm 131 along with the encryption key installed on a machine (e.g., a personal computer) at a node in the cyber-protected communications network 170 renders it a SMX protected machine 141 because the only way a removable media device will function in that SMX protected machine is if it has already been successfully "checked-in" by the SMX kiosk 110 which as described above adds encryption or a related digital certificate to the removable media device. As known in the art of encryption certificate-based encryption is a system in which a certificate authority uses ID-based cryptography to produce a certificate. FIG. 1 also depicts the inaccessibility of the altered removable media device 138' to un-protected machines 142 in the cyber-protected communications network 170 that lacks a disclosed SMX algorithm 131 and the key to the encryption.

The enclosure 115 includes an aperture 115a and the SMX kiosk 110 includes at least one removable media interface 110a (e.g., a USB port) or other periphery device interface aligned with the aperture 115a for receiving a removable media device 138 inserted by a user. The enclosure 115 has another aperture 115b that exposes a user interface 110b (e.g., a touch screen) designed to provide the user 125 simple access to functions of the SMX kiosk 110.

This physical limitation provided by disclosed enclosures 115 to access only the SMX kiosk's 110 removable media interface 110a and user interface 110b can be accomplished for example with a sheet metal (e.g., aluminum) or hardened (e.g., molded) plastic enclosure. The enclosure 115 generally also allows physical access to the SMX kiosk 110 with a lock or security screws such as generally used in automated teller machines to provide administrative maintenance for the SMX kiosk 110. The enclosure 115 and the mounting bracket is generally also constructed so that all the mounting screws are not accessible unless the enclosure 115 is physically unlocked and the SMX kiosk 110 is removed from the enclosure 115 to expose the mounting system.

A typical disclosed enclosure 115 is now described. As described above, the enclosure 115 is configured to prevent protection access to digital security related features including physical controls, input ports and output ports and power to the SMX kiosk 110 from being tampered with, and also preventing its keys such as a WINDOWS Key from being accessed. The enclosure 115 also generally allows access to a fingerprint reader that may be provided on the back of the SMX kiosk 110 and the programmable keys on the front of the SMX kiosk 110. The enclosure 115 generally does not restrict the front facing camera, status light or ambient light sensor, and also generally does not restrict access for air flow to the fans on the tablet and or heat sinks. The enclosure 115 generally also has hinges and a physical lock for access to thereto. A molded case would not require hinges and a physical lock but still secures the SMX kiosk 110 and restricts access to USB and power cables. The enclosure 115 may be part of the mounting systems and/or integrated into the design to secure the SMX kiosk 110 to a wall or other surface.

Figure 2:
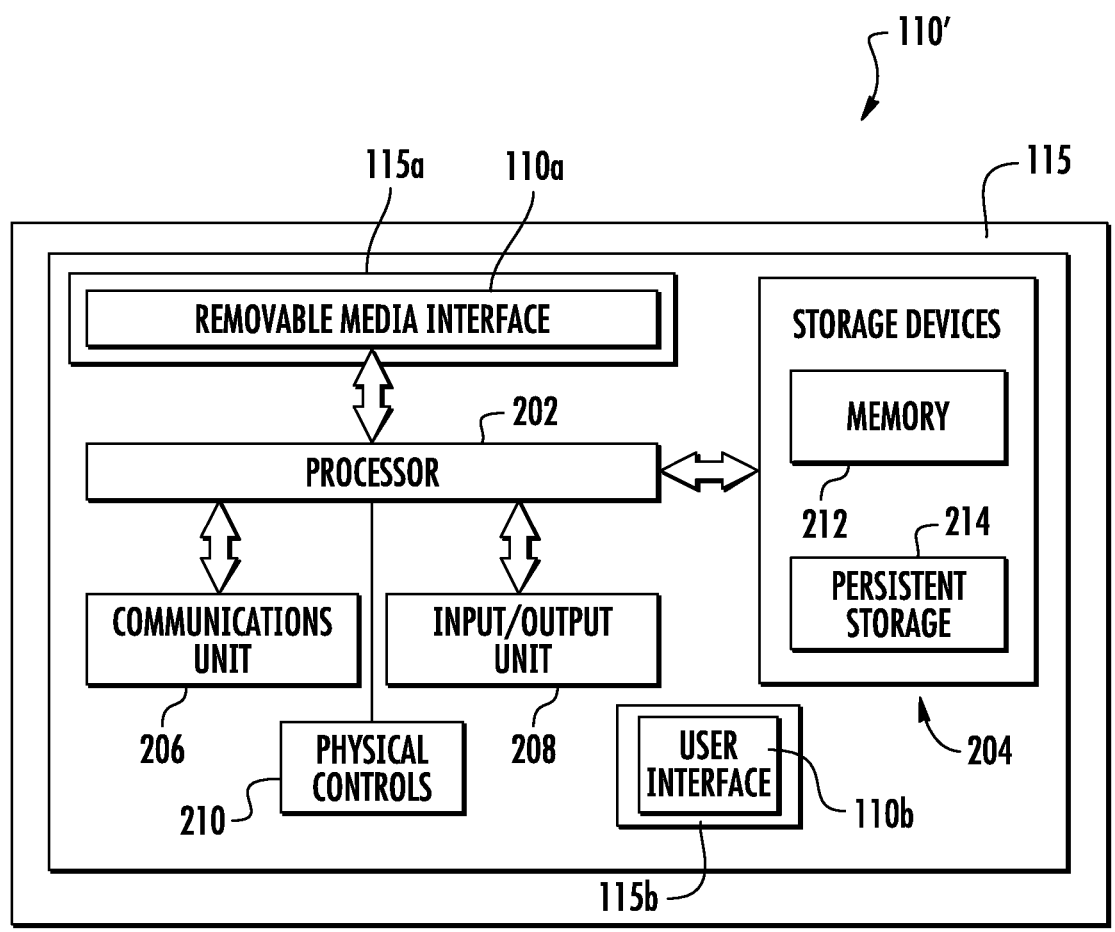
FIG. 2 shows a block diagram of components of an example SMX kiosk.

FIG. 2 shows a block diagram of components of an example SMX kiosk shown as 110' having an enclosure 115 including an aperture 115a for access to the removable media interface 110a and another aperture 115b for access to the user interface 110b. All other kiosk components are covered by the enclosure 115. The SMX kiosk 110' includes at least one processor 202, at least one storage device 204, at least one communications unit 206, at least one input/output (I/O) unit 208, and at least one removable media interface 110a. The processor 202 can execute instructions, such as those that may be loaded into a memory 212. Processor 202 denotes any suitable processing device, such as one or more microprocessors, microcontrollers, digital signal processors, application specific integrated circuits (ASICs), field programmable gate arrays (FPGAs), or discrete circuitry.

The memory 212 and a persistent storage 214 are examples of storage devices 204, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, flash memory, or optical disc.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Each removable media interface 110a denotes a structure to which a storage device can be coupled. For example, the SMX kiosk 110' can include one or more USB slots, Secure Digital High Capacity (SDHC) or other flash memory slots, or other interfaces for coupling to storage devices. Depending on the implementation, the SMX kiosk 110' can include a single removable media interface 110a or multiple removable media interfaces 110a of the same type or of different types.

The processor 202 executes instructions implementing the SMX kiosk 110', such as an SMX server. For example, when a storage device is inserted into or otherwise coupled to a removable media interface 110a, the processor 202 can execute instructions for checking-in or checking-out the storage device. The processor 202 can also execute instructions for interacting with a security manager, threat analysis server, or other external system. SMX kiosk 110' also includes physical controls 210 that are also covered by the enclosure 115.

Figure 3:
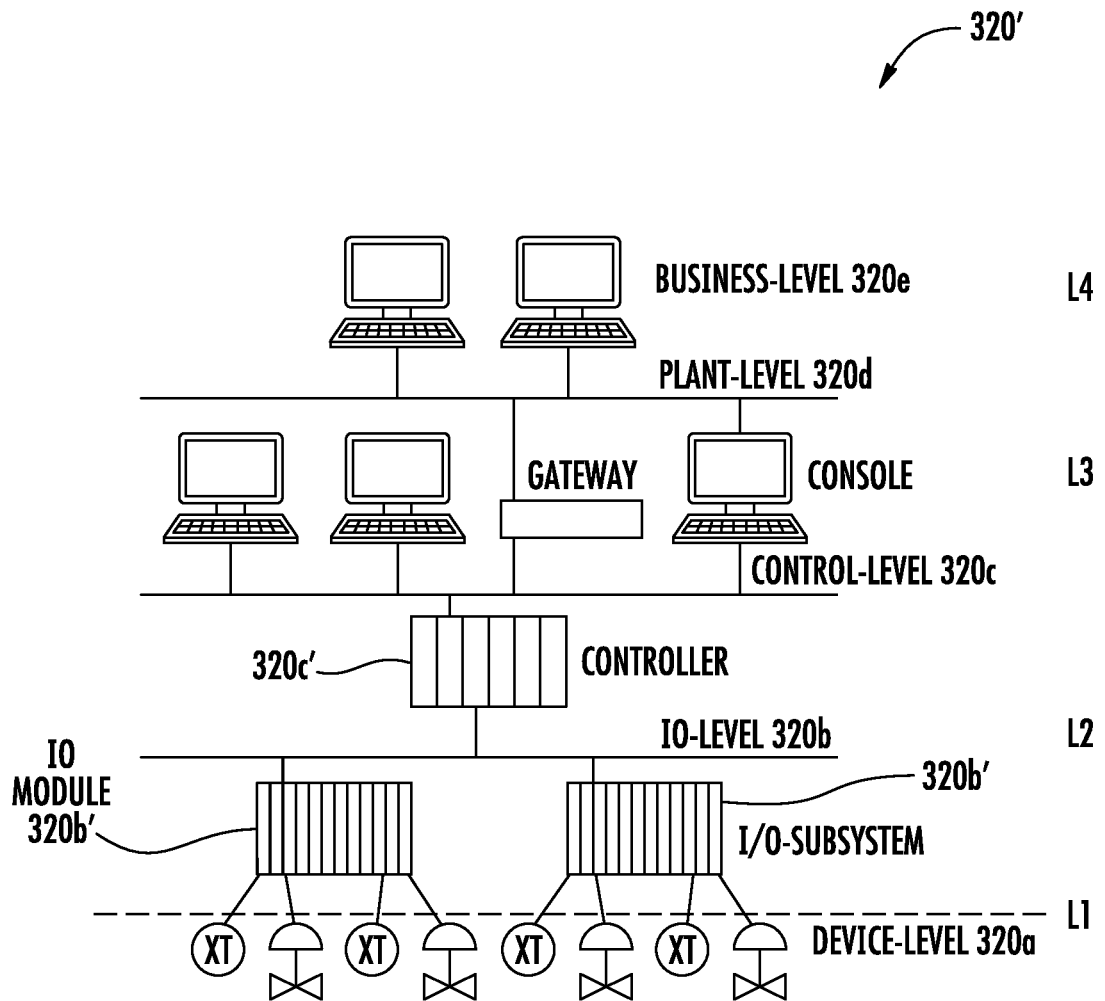
FIG. 3 shows an example distributed control system (DCS) having five different tiers (or levels) of networking, where all five tiers can benefit from disclosed protected removable media data transfer in a cyber-protected system.

FIG. 3 shows a DCS having five different tiers of networking, where machines/systems/devices at network nodes on all five tiers can benefit from disclosed cyber-protection. The network levels include a device-level 320a, input/output (IO)-level 320b, control-level 320c, plant-level 320d and business (or enterprise) level 320e. The device-level 320a includes gauges, valves, transmitters, actuators, sensors and other devices. The IO-level 320b includes IO modules 320b'. The control-level 320c includes at least one controller 320c' which generally includes workstations, servers and networked devices. It is noted that a controller can be based on a server platform or can be a proprietary platform, so that there can be servers in the DCS 320' that perform the control function which are technically not controllers.

EXAMPLES

Disclosed embodiments of the invention are further illustrated by the following specific Examples, which should not be construed as limiting the scope or content of this Disclosure in any way.

Figure 4A:
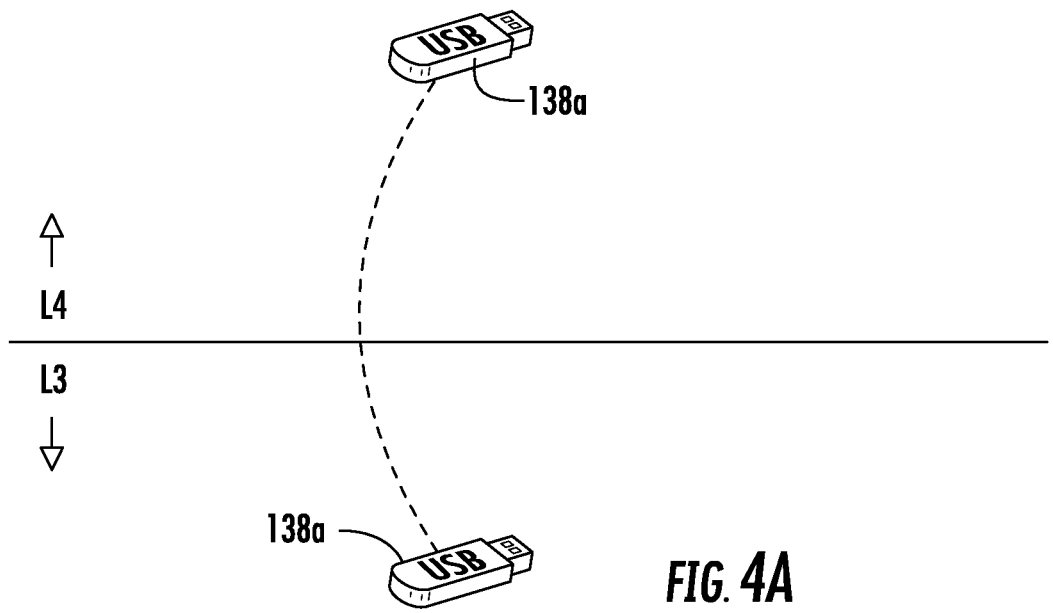
FIGS. 4A-G depict example aspects for disclosed methods of protected data transfer by a removable media device into and out of a cyber-protected network.
Figure 4B:
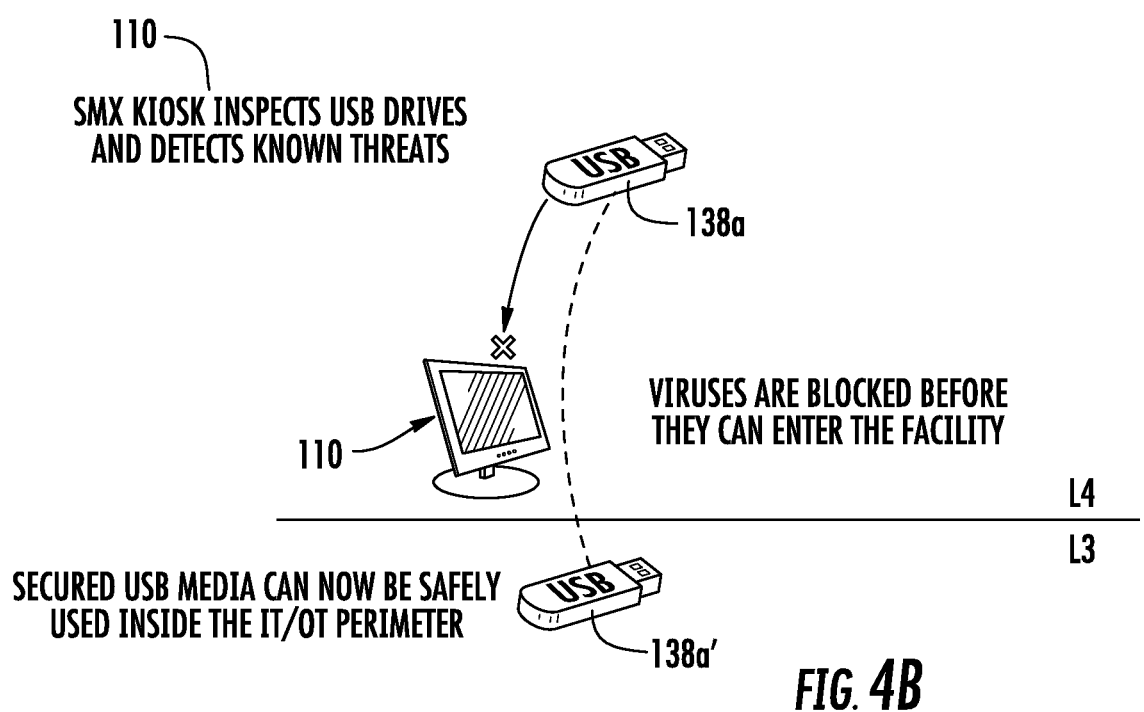
Figure 4C:
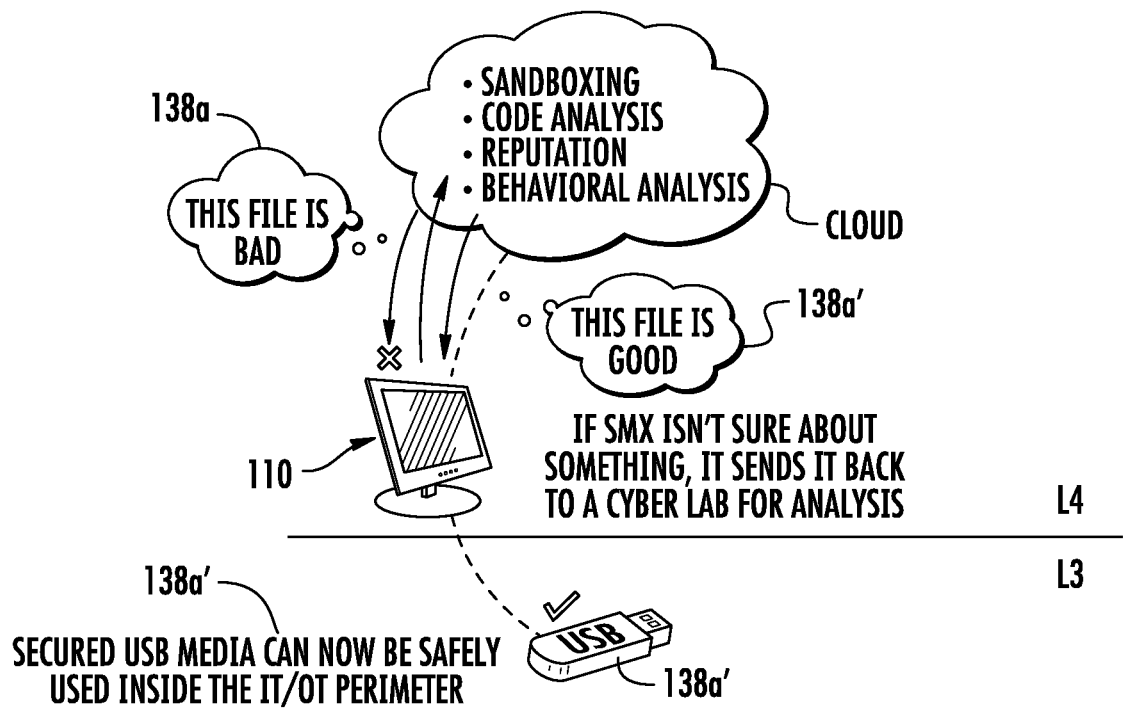

FIGS. 4A-G depict example aspects for disclosed methods of protected data transfer by a removable media device into and out of a cyber-protected network using a disclosed SMX kiosk running a cyber-checking algorithm for inspecting removable media devices for known threats and adding encryption to the removable media device only if passing the inspecting and an SMX protected machine at a protected system node having an SMX algorithm and a key to the encryption. In FIG. 4A a removable media device shown as a USB drive 138a is shown crossing from L3 (the control level) and L4 corresponding to Purdue level 3 (the control level) and level 4 (plant level), respectively, which can bring in a vector (e.g., virus) to a machine, device or system on a node in L4 or to the entire secure communications network. FIG. 4B shows the SMX kiosk 110 that utilizes a cyber-checking algorithm 121 cyber-inspecting the USB drive 138a and detecting known threats, with secured USB drive 138a' now being shown because the SMX kiosk 110 did not find any threat so that it added encryption to the USB drive 138a. As described above, if a threat (e.g., virus) is found encryption is not added to the USB drive 138a, thus blocking the virus on the USB drive 138a so that it cannot enter information into any machine on the network of the cyber-secure system that runs a disclosed SMX algorithm. FIG. 4C shows if the SMX kiosk 110 is not sure about a file on the USB drive 138a, it can be sent to a cyber-lab for analysis, shown by example as being a cloud-based cyber lab.

Figure 4D:
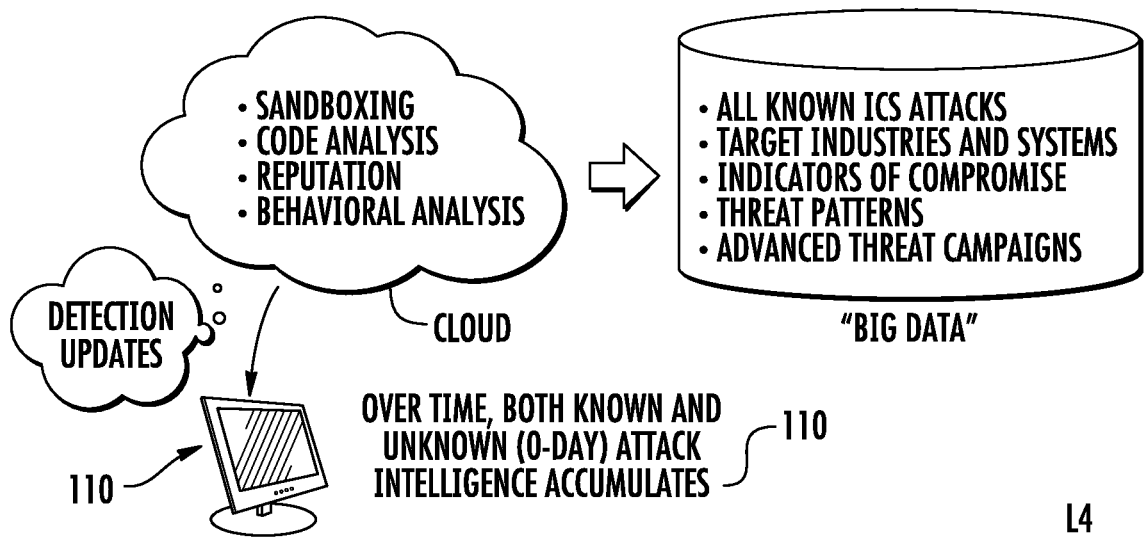
Figure 4E:
Figure 4F:
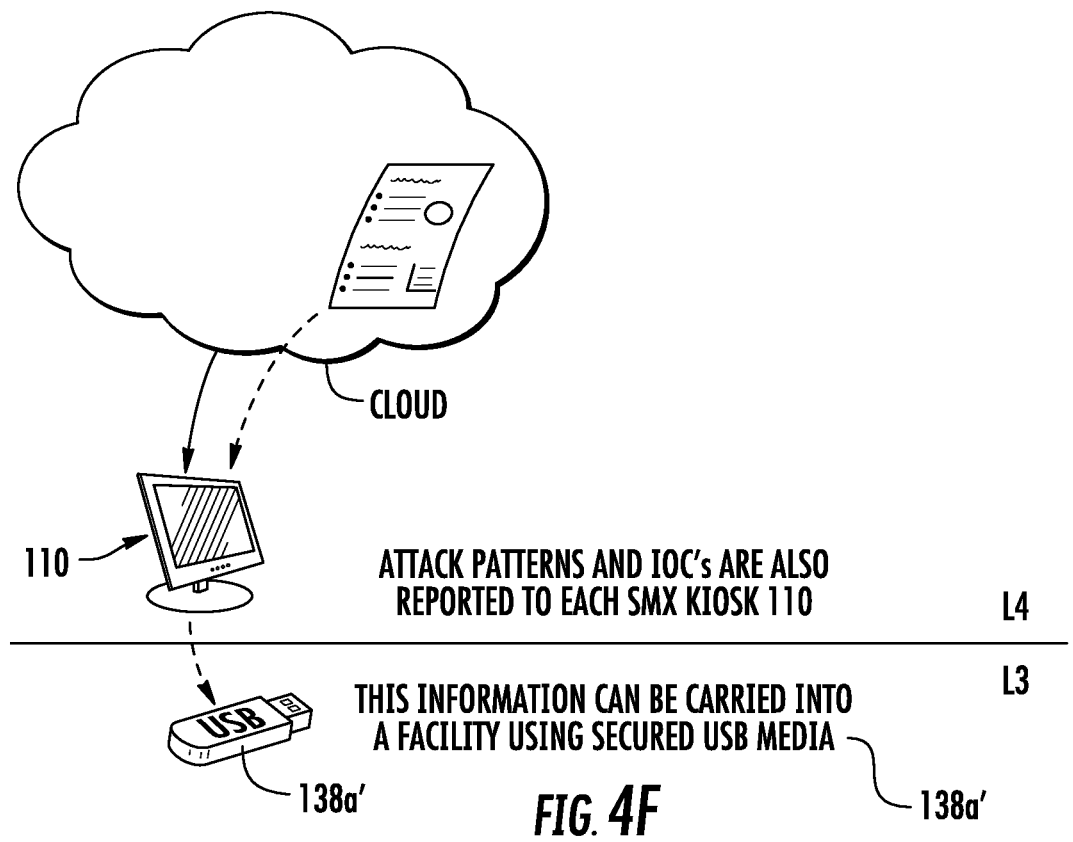
Figure 4G:
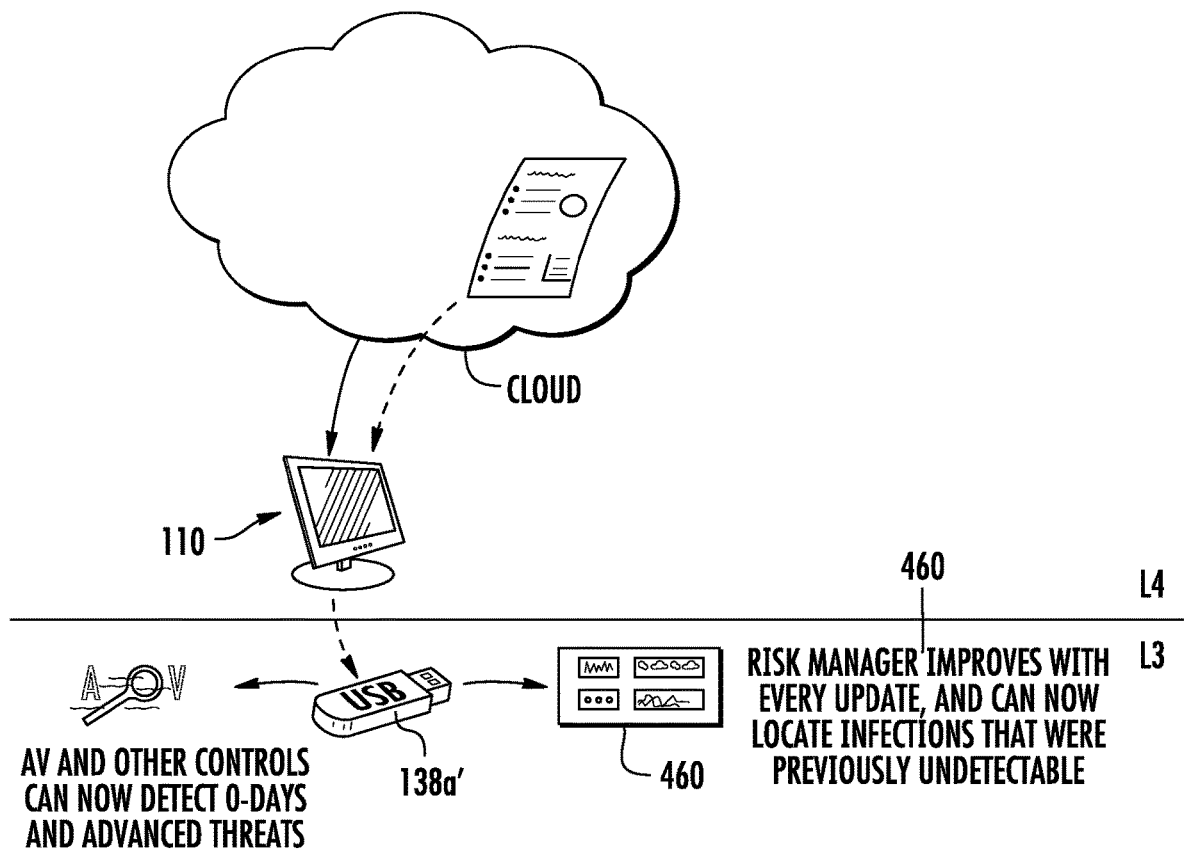

FIG. 4D depicts the SMX kiosk 110 accumulating cyber-intelligence regarding threats (e.g., viruses) over time, such as from threat updates received from the cloud. FIG. 4E shows detailed threat reports generated in the cloud that are sent to the SMX kiosk 110 that thus receives updated threat intelligence. FIG. 4F shows a secured USB drive 138a' carried into L3 of the facility and the attack patterns and Indicators of Compromise (IOC's) received from the SMX kiosk 110 that obtained this information from the cloud. Before disclosed methods of removable media data transfer in a cyber-protected system removable media devices such as USB drives were not safe so that the network would have to have been opened or updates never provided. FIG. 4G shows a secured USB drive 138a' receiving anti-virus (AV) and other cyber controls from an SMX kiosk 110 (that obtains this information from the cloud) for updating a risk manager system 460 to be able to identify infections that were previously undetectable.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

The invention claimed is:

1. A method of data transfer in a cyber-protected system, comprising:
inserting a removable media device into a removable media interface of a Secure Media Exchange (SMX) kiosk which includes a processor and an associated memory for running a cyber-checking algorithm, said SMX kiosk also including a user interface, physical controls, input ports and output ports, said SMX kiosk having an enclosure for physical tamper protection which prevents access to digital security related features including said physical controls, said input ports and said output ports with exclusively only openings revealing said removable media interface and said user interface;
said cyber-checking algorithm including code for inspecting said removable media device for known threats and said cyber-checking algorithm adding a certificate-based encryption to said removable media device only if said removable media device is found to be passing said inspecting;
wherein said cyber-protected system includes a plurality of networked devices coupled to communicate with one another over a communications network including at least one SMX protected machine at a protected system node having an SMX algorithm and a key to said certificate-based encryption stored in said memory, said SMX algorithm allowing reading information from said removable media device on said SMX protected machine using said key if said SMX protected machine confirms a presence of said certificate-based encryption, and not allowing said reading information from said removable media device if said certificate-based encryption is not found to be present;

wherein said SMX kiosk is positioned in a location outside of said communications network and said cyber-checking algorithm is stored on a node in said communications network that is communicably coupled to said SMX kiosk.

2. The method of claim 1, wherein said cyber-protected system comprises an Industrial Control System (ICS) including field devices at a device-level including at least one of sensors and actuators, an input output (IO)-level, a control-level, a plant-level, and a business-level, wherein said cyber-checking algorithm is stored on said business-level of said ICS.

3. The method of claim 1, further comprising removing said certificate-based encryption to said removable media device after transferring data to the protected machine so that said removable media device is no longer readable on said SMX protected machine, and wherein said removable media device is readable on a non-protected machine in said communications network.

4. The method of claim 1, wherein said cyber-protected system further comprises a computing system having knowledge of attacks throughout said cyber-protected system updating said cyber-checking algorithm based on said attacks.

5. The method of claim 4, wherein said computing system is cloud-located.

6. The method of claim 1, wherein said removable media device can only be accessed by a machine in said cyber-protected system that is running said SMX algorithm.

7. A Secure Media Exchange (SMX) kiosk, comprising:
a processor and an associated memory for running a cyber-checking algorithm;
a user interface, physical controls, input ports and output ports and a removable media interface for inserting a removable media device;
an enclosure for physical tamper protection which prevents access to digital security related features including said physical controls, said input ports and said output ports that has openings exclusively only revealing the removable media interface and the user interface;
wherein said SMX kiosk is configured for being positioned within a cyber-protected system that includes a plurality of networked devices coupled to communicate with one another over a communications network including at least one SMX protected machine at a protected system node having an SMX algorithm and a key to said certificate-based encryption stored in said memory, said SMX algorithm allowing reading information from said removable media device on said SMX protected machine using said key if said SMX protected machine confirms a presence of said certificate-based encryption, and not allowing said reading information from said removable media device if said certificate-based encryption is not found to be present;
wherein said SMX kiosk is configured for being positioned in a location outside of said communications network and a cyber-checking algorithm is configured for being stored at a node in said communications network that is communicably coupled to said SMX kiosk;
said cyber-checking algorithm having code for inspecting said removable media device for known threats and said cyber-checking algorithm for adding a certificate-based encryption to said removable media device only if said removable media device is found to be passing said inspecting.

8. A cyber-protected system including a communications network, comprising:
a plurality of networked devices coupled to communicate with one another over said communications network;
A Secure Media Exchange (SMX) kiosk including:
a processor and an associated memory for running a cyber-checking algorithm;
a user interface, physical controls, input ports and output ports and a removable media interface for inserting a removable media device;
an enclosure for physical tamper protection which prevents access to digital security related features including said physical controls, said input ports and said output ports that has openings exclusively only revealing the removable media interface and the user interface;
said cyber-checking algorithm having code for inspecting said removable media device for known threats and said cyber-checking algorithm for adding a certificate-based encryption to said removable media device only if said removable media device is found to be passing said inspecting, and
an SMX algorithm installed on at least a first of said plurality of networked devices including a first memory for storing a key to said certificate-based encryption, said SMX algorithm for allowing reading information from said removable media device on an SMX protected machine using said key if said SMX algorithm confirms a presence of said certificate-based encryption, and not allowing said reading information from said removable media device if said certificate-based encryption is not found to be present;
wherein said SMX kiosk is positioned in a location outside of said communications network and said cyber-checking algorithm is stored on a node in said communications network.

9. The system of claim 8, wherein said cyber-protected system comprises an Industrial Control System (ICS) including field devices at a device-level including at least one of sensors and actuators, an input output (IO)-level, a control-level, a plant-level, and a business-level, wherein said cyber-checking algorithm is stored on said business level of said ICS.

10. The system of claim 8, further comprising removing said certificate-based encryption to said removable media device after finishing transferring data to the protected machine so that said removable media device is no longer readable on said SMX protected machine, and wherein said removable media device is readable on a non-protected machine in said communications network.

11. The system of claim 8, wherein said cyber-protected system further comprises a computing system having knowledge of attacks throughout said cyber-protected system for updating said cyber-checking algorithm based on said attacks.

12. The system of claim 11, wherein said computing system is cloud-located.

13. The system of claim 8, wherein said removable media device can only be accessed by a machine in said cyber-protected system that is running said SMX algorithm.

* * * * *